(12) United States Patent
Dianda

(10) Patent No.: US 7,881,452 B1
(45) Date of Patent: Feb. 1, 2011

(54) METHOD FOR TESTING A LOCAL NUMBER PORTABILITY (LNP) PORTED TELEPHONE NUMBER

(75) Inventor: Robert B. Dianda, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1353 days.

(21) Appl. No.: 11/384,597

(22) Filed: Mar. 20, 2006

(51) Int. Cl.
*H04M 7/00* (2006.01)
*H04M 1/24* (2006.01)
*H04M 3/08* (2006.01)
*H04M 3/22* (2006.01)

(52) U.S. Cl. ............... 379/221.13; 379/27.01; 379/27.02; 379/219; 379/220.01

(58) Field of Classification Search ............ 379/221.13, 379/27.01, 220.01, 219, 233, 234, 27.02, 379/27.03
See application file for complete search history.

(56) References Cited

U.S. PATENT DOCUMENTS

| | | | | |
|---|---|---|---|---|
| 6,128,377 A | * | 10/2000 | Sonnenberg | ............ 379/221.13 |
| 6,259,783 B1 | * | 7/2001 | Tewani et al. | ........... 379/220.01 |
| 6,549,620 B2 | | 4/2003 | Hao | |
| 7,020,249 B1 | * | 3/2006 | Haines et al. | ............. 379/27.01 |
| 2002/0176562 A1 | | 11/2002 | Hao | |

* cited by examiner

*Primary Examiner*—Thjuan K Addy

(57) ABSTRACT

A method for testing a Local Number Portability (LNP) ported telephone number is provided according to the invention. The method includes in a first switch generating a LNP test telephone call to a second switch. The LNP test telephone call is targeted to the LNP-ported telephone number associated with the first switch. The method further includes indicating that the LNP-ported telephone number is being correctly routed in the second switch if the first switch receives the LNP test telephone call back from the second switch. The method further includes indicating that the LNP-ported telephone number is being incorrectly routed in the second switch if the first switch does not receive the LNP test telephone call back from the second switch.

28 Claims, 12 Drawing Sheets

METHOD FOR TESTING A LOCAL NUMBER PORTABILITY (LNP) PORTED TELEPHONE NUMBER

BACKGROUND OF THE INVENTION

1. Field of the Invention

The invention is related to the field of Local Number Portability (LNP) capability, and in particular, to a method for testing a LNP-ported telephone number.

2. Statement of the Problem

Local Number Portability (LNP) is a scheme for allowing persons (and/or institutions) to keep an existing telephone number. The LNP capability allows a subscriber to keep an existing telephone number even when the subscriber physically moves or when the subscriber changes telephone service providers. The LNP capability enables subscribers to move or change service providers without the need to inform all potential callers of a new telephone number. The LNP process is transparent to both the caller and the called party.

Before LNP, telephone numbers were assigned to a local service-provider's end offices on an NPA-NXX basis. An NPA-NXX is defined as the Numbering Plan Area (NPA) and an office code (NXX) of an end user's telephone number (e.g., 123-456-7890). Each NPA-NXX can include up to 10,000 different telephone numbers. In the past, a telephone number identified the person/telephone, as well as the actual end office or telephone switching system that served the person. As a result, the dialed NPA-NXX was the terminating switch's routing address to the rest of the network. With the implementation of LNP, which allows any number of local service providers to serve the same NPA-NXX, this routing scheme could no longer be used.

The LNP architecture utilizes a unique 6-digit LRN to identify each switch in the network for call routing purposes. Each switch is assigned a LRN. Consequently, a LNP information entry correlates a dialed (i.e., destination) telephone number to a LRN of a terminating switch. The LRN is used to route the call to the terminating switch, and the original dialed telephone number is then used by the terminating switch to complete the call.

FIG. 1 shows a conventional prior art LNP process, wherein a destination telephone number has been ported using the LNP capability. The source telephone initiates a telephone call to the destination telephone by dialing a destination telephone number. The dialed number is received in a local (originating) switch. The originating switch can signal a routing resource, such as a Signal Control Point (SCP), in order to obtain routing information for the destination telephone. The originating switch performs a "LNP dip" and accesses a LNP database or other LNP information. If the dialed number is in the LNP database, the telephone number has been ported via local number portability. If the dialed number is not in the LNP database, the dialed number is used to route and connect the telephone call. In this example, the LNP dip produces a 10 digit number, where a Location Routing Number (LRN) is the first 6 digits. Herein the term sub-LRN refers to the use of all 10 digits for routing and connecting the telephone call, rather than using just the 6 digit LRN. This 10 digit number is substituted into a Called party Number Field (CdPN) of the call signaling, replacing the dialed number. The dialed number, however, is retained in a Generic Address Parameter (GAP) field of the call signaling for future use. The SCP provides the LRN and the dialed number back to the originating switch. The originating switch then routes and connects the telephone call to the terminating switch. The telephone call can transit any number of intermediate switches. The terminating switch receives the telephone call, according to the LRN (i.e., the first 6 digits of the called party number parameter). The terminating switch recognizes its LRN, retrieves the original dialed number from the GAP, and connects the telephone call to the destination telephone using the dialed number.

When a LNP dip is not performed for a ported number (e.g., the originating switch is not LNP capable) or when the LNP dip fails, then the call will be routed based on the originally dialed telephone number. The call will accordingly be routed to the switch from which the number was ported. This switch will perform a LNP dip and will route the call based on the LRN obtained from this LNP dip.

On occasion, a new switch is added to a telephone network. A new switch may be added for various reasons, including replacement of an existing switch, upgrading of an existing switch, adding a switch to handle increased number of subscribers, adding a new switch as an interface to another network, etc. The addition of a new switch will likely require assignment of a LRN number to the new switch. In addition, the routing information of existing switches will need to be updated in order to properly route a call that includes the LRN of the new switch. If the routing information for the LRN is incorrect, calls to telephone numbers assigned to the new switch will fail.

SUMMARY OF THE SOLUTION

A method for testing a Local Number Portability (LNP) ported telephone number is provided according to the invention. The method comprises in a first switch generating a LNP test telephone call to a second switch. The LNP test telephone call is targeted to the LNP-ported telephone number associated with the first switch. The method further comprises indicating that the LNP-ported telephone number is being correctly routed in the second switch if the first switch receives the LNP test telephone call back from the second switch. The method further comprises indicating that the LNP-ported telephone number is being incorrectly routed in the second switch if the first switch does not receive the LNP test telephone call back from the second switch.

A method for testing a LNP-ported telephone number is provided according to the invention. The method comprises in a first switch generating a LNP test telephone call to a second switch. The LNP test telephone call is targeted to the LNP-ported telephone number associated with the first switch. The method further comprises indicating that the LNP-ported telephone number is being correctly routed in the second switch if the first switch receives the LNP test telephone call back from the second switch. The method further comprises in the first switch generating a LRN test telephone call to the second switch if the first switch does not receive the LNP test telephone call back from the second switch. The LRN test telephone call is targeted to the LRN of the first switch. The method further comprises indicating that the LRN is being incorrectly routed in the second switch if the first switch does not receive the LNP test telephone call back from the second switch and if the first switch does not receive the LRN test telephone call back from the second switch. The method further comprises indicating that an LNP dip performed by the second switch produced an erroneous LRN for the LNP test telephone call if the first switch does not receive the LNP test telephone call back from the second switch and if the first switch receives the LRN test telephone call back from the second switch.

A method for testing a LNP-ported telephone number is provided according to the invention. The method comprises disabling a LNP dip capability in a first switch and in the first switch generating a LNP test telephone call to a third switch through at least a second switch. The LNP test telephone call is targeted to the LNP-ported telephone number associated with the first switch. The method further comprises indicating that the LNP-ported telephone number is being correctly routed in the third switch if the first switch receives the LNP test telephone call back from the third switch. The method further comprises indicating that the LNP-ported telephone number is being incorrectly routed in the third switch or in some intermediate switch if the first switch does not receive the LNP test telephone call back from the third switch.

DESCRIPTION OF THE DRAWINGS

The same reference number represents the same element on all drawings.

DETAILED DESCRIPTION OF THE INVENTION

FIGS. 2-12 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
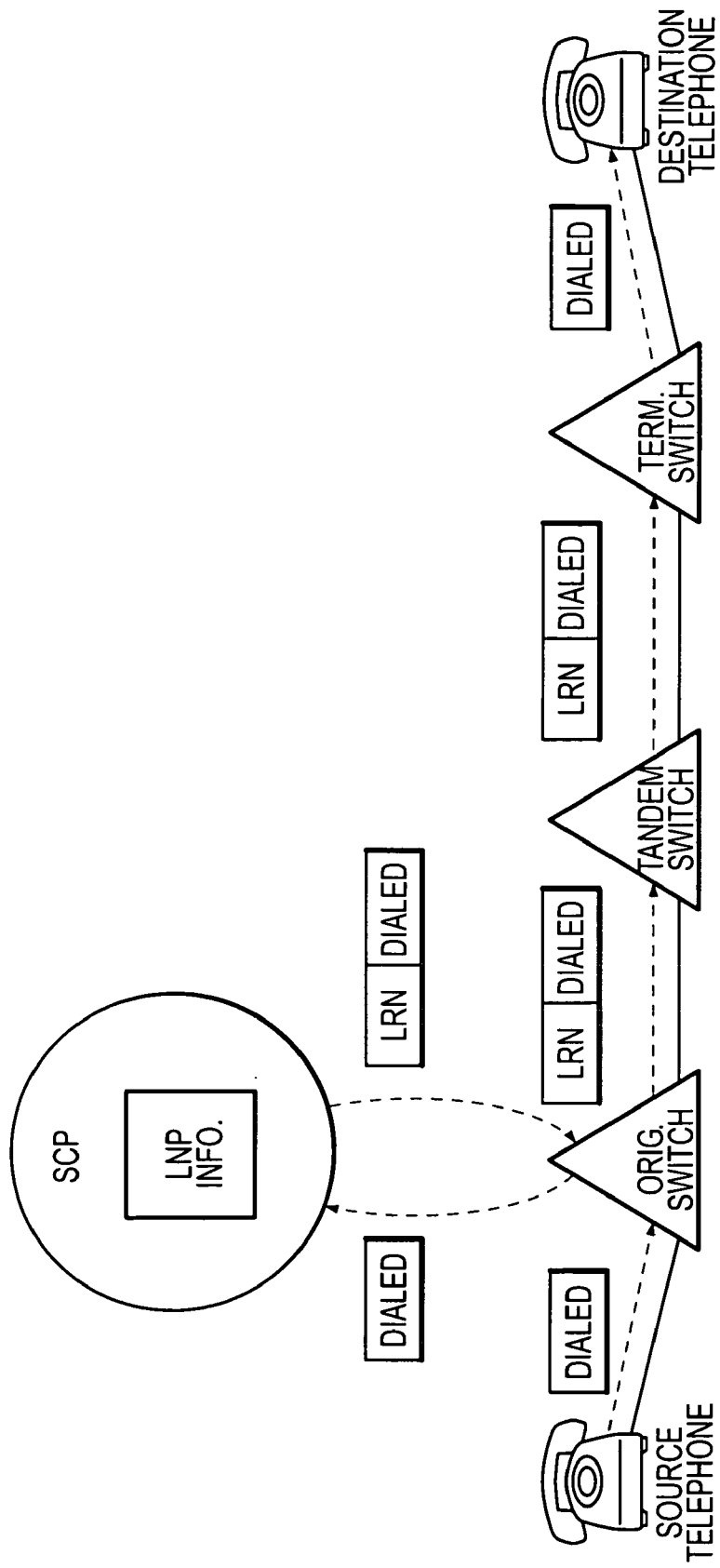
FIG. 1 shows a conventional, prior art LNP process, wherein a destination telephone number has been ported using the LNP capability.
Figure 2:
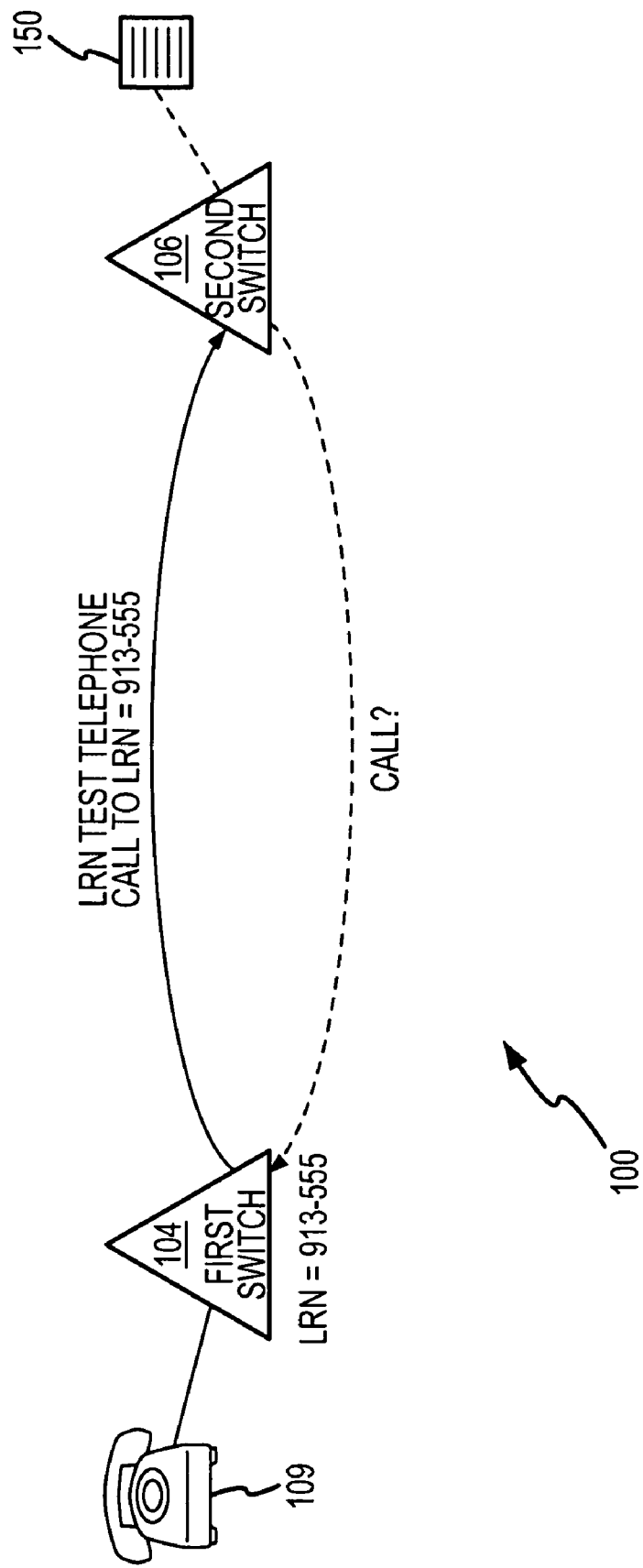
FIG. 2 shows a switch environment for testing an assigned Location Routing Number (LRN) according to an embodiment of the invention.

FIG. 2 shows a switch environment 100 for testing an assigned Location Routing Number (LRN) according to an embodiment of the invention. Elements in common share reference numbers. The LRN is assigned to a first switch 104. The switch environment 100 includes at least the first switch 104 and a second switch 106. It should be understood that the switch environment 100 can include additional switches. The first switch 104 is assigned a LRN of 913-555. The second switch 106 includes routing information 150 that is used by the second switch 106 to route a telephone call that includes a LRN. The LRN testing in this figure tests the routing information 150 of the second switch 106 and determines if the LRN assigned to the first switch 104 is properly routed by the routing information 150.

In the LRN test, the first switch 104 generates a LRN test telephone call to the second switch 106. The LRN test telephone call is targeted to the LRN that is assigned to the first switch 104, i.e., the Called Party Number (CdPN) field of the LRN test telephone call includes the 6-digit LRN. The LRN test telephone call is not transmitted to the second switch 106 using a telephone number and the LRN test telephone call does not have to be originated from a telephone. The LRN test telephone call can be generated by the first switch 104 according to programming of the first switch 104 or can be generated by a device in communication with the first switch 104.

Upon receiving the LRN test telephone call, the second switch 106 will transfer the LRN test telephone call on to another switch, as the second switch 106 is not the destination switch. The second switch 106 will transfer the LRN test telephone call based on information within the call signaling of the LRN test telephone call. If the LRN of the first switch 104 is correctly programmed into the routing information 150 of the second switch 106, then the second switch 106 will route the LRN test telephone call back to the first switch 104 based on LRN. As a result, if the LRN test telephone call (and/or call signaling, for example) is not received back in the first switch 104 within a predetermined time period, then an error must exist within the LRN routing process in the second switch 106.

Consequently, the test indicates that the LRN is being correctly routed in the second switch 106 if the first switch 104 receives the LRN test telephone call back from the second switch 106. The test indicates that the LRN is being incorrectly routed in the second switch 106 if the first switch 104 does not receive the LRN test telephone call back from the second switch 106.

The error indication can comprise any manner of error signal, message, record, log, etc. In one embodiment, the LRN testing can be performed for multiple switches, and error indications can be accumulated or copied to a central error log that indicates which switches of the multiple switches have incorrect routing information, if any.

Figure 3:
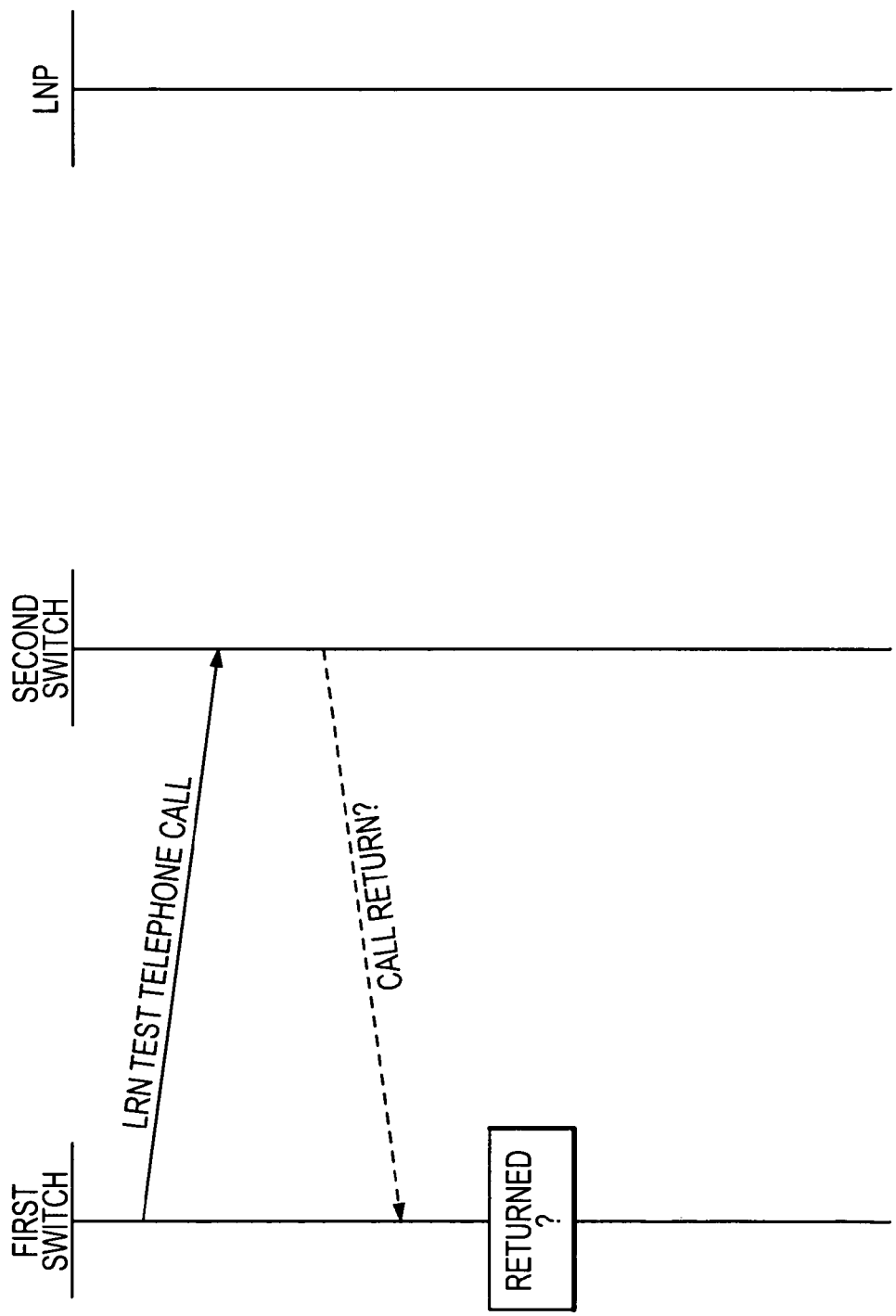
FIG. 3 is a message flow diagram for the LRN testing of FIG. 2, showing messages that are generated in the test according to an embodiment of the invention.

FIG. 3 is a message flow diagram for the LRN testing of FIG. 2, showing messages that are generated in the test according to an embodiment of the invention. The first switch 104 generates a LRN test telephone call to the second switch 106. The LRN test telephone call is targeted to the LRN that is assigned to the first switch 104. The second switch 106 receives the LRN test telephone call and performs routing based on the LRN included in the LRN test telephone call. Because the LRN test telephone call already includes an LRN, the second switch 106 does not need to perform a LNP dip. The second switch 106 consults the routing information 150. If the second switch 106 is properly configured, the second switch 106 will return the LRN test telephone call to the first switch 104. However, if the routing information 150 is not correct, then the LRN test telephone call will not be returned to the first switch 104. If the first switch 104 receives the LRN test telephone call back from the second switch 106, then the test can be determined to be successful and the LRN has been correctly routed in the second switch 106.

Figure 4:
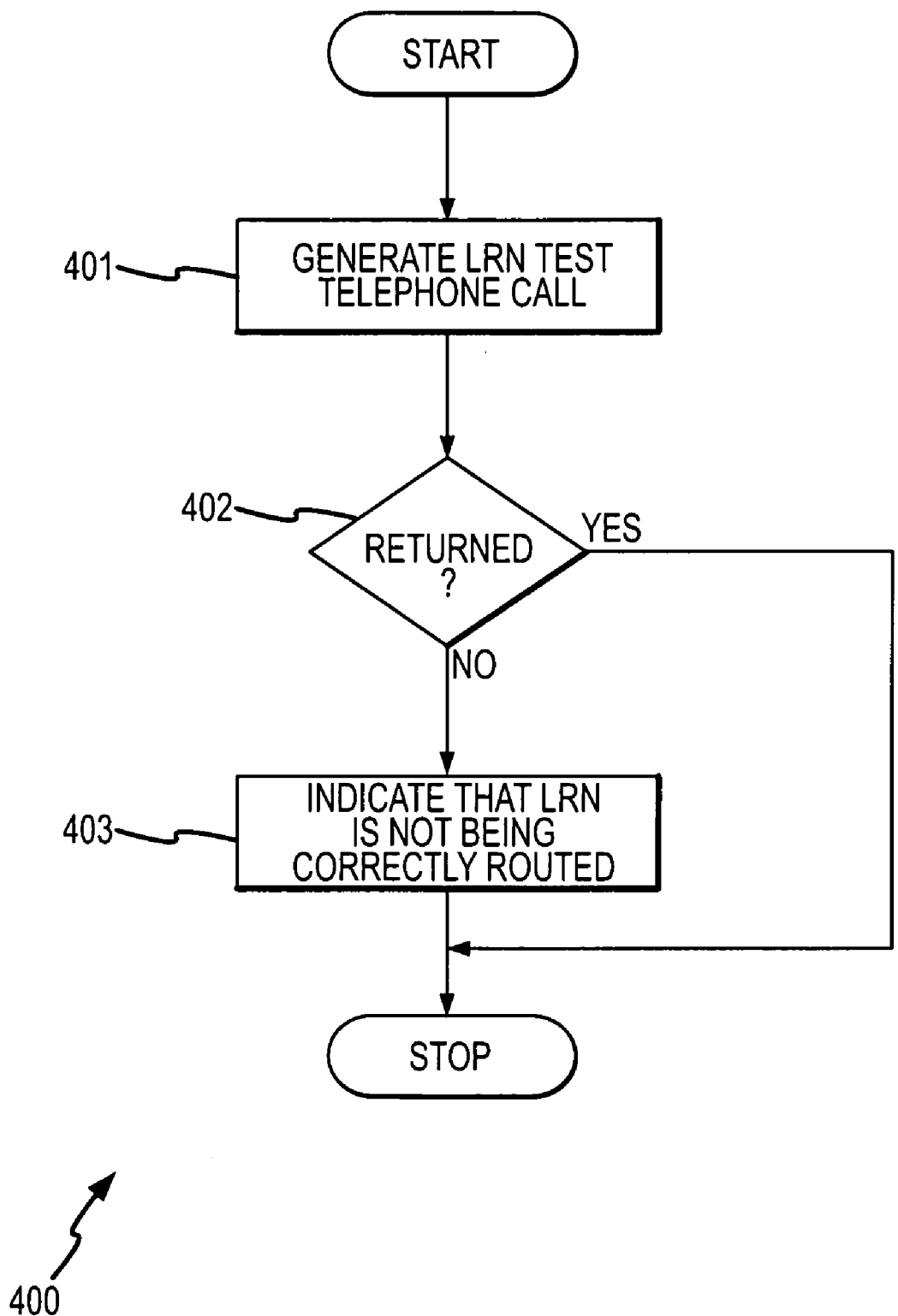
FIG. 4 is a flowchart of a method for testing an assigned LRN according to an embodiment of the invention.

FIG. 4 is a flowchart 400 of a method for testing an assigned LRN according to an embodiment of the invention. The LRN is assigned to a first switch 104. In step 401, the first switch 104 generates a LRN test telephone call to the second switch 106, with the LRN test telephone call being targeted to the LRN of the first switch 104, as previously discussed.

In step 402, the first switch 104 waits for the LRN test telephone call to be returned back from the second switch 106. The first switch 104 waits for a predetermined time period. If the LRN test telephone call is not returned from the second switch 106 by the end of the predetermined time period, then the method proceeds to step 403. Otherwise, if the LRN test telephone call is returned from the second switch 106 by the end of the predetermined time period, the method exits.

In step 403, because the LRN test telephone call is not returned from the second switch 106, an error is indicated.

The LRN testing can additionally be performed in an automated fashion. For example, LRN testing schedules can be transmitted to various switches of a communication network. A LRN testing schedule can include testing information such as an originating switch identifier, a targeted switch identifier, a testing time when the test is to be performed, and one or more LRNs to be tested. The originating switch can receive the testing schedule and can perform the LRN testing that is specified in the testing information.

Figure 5:
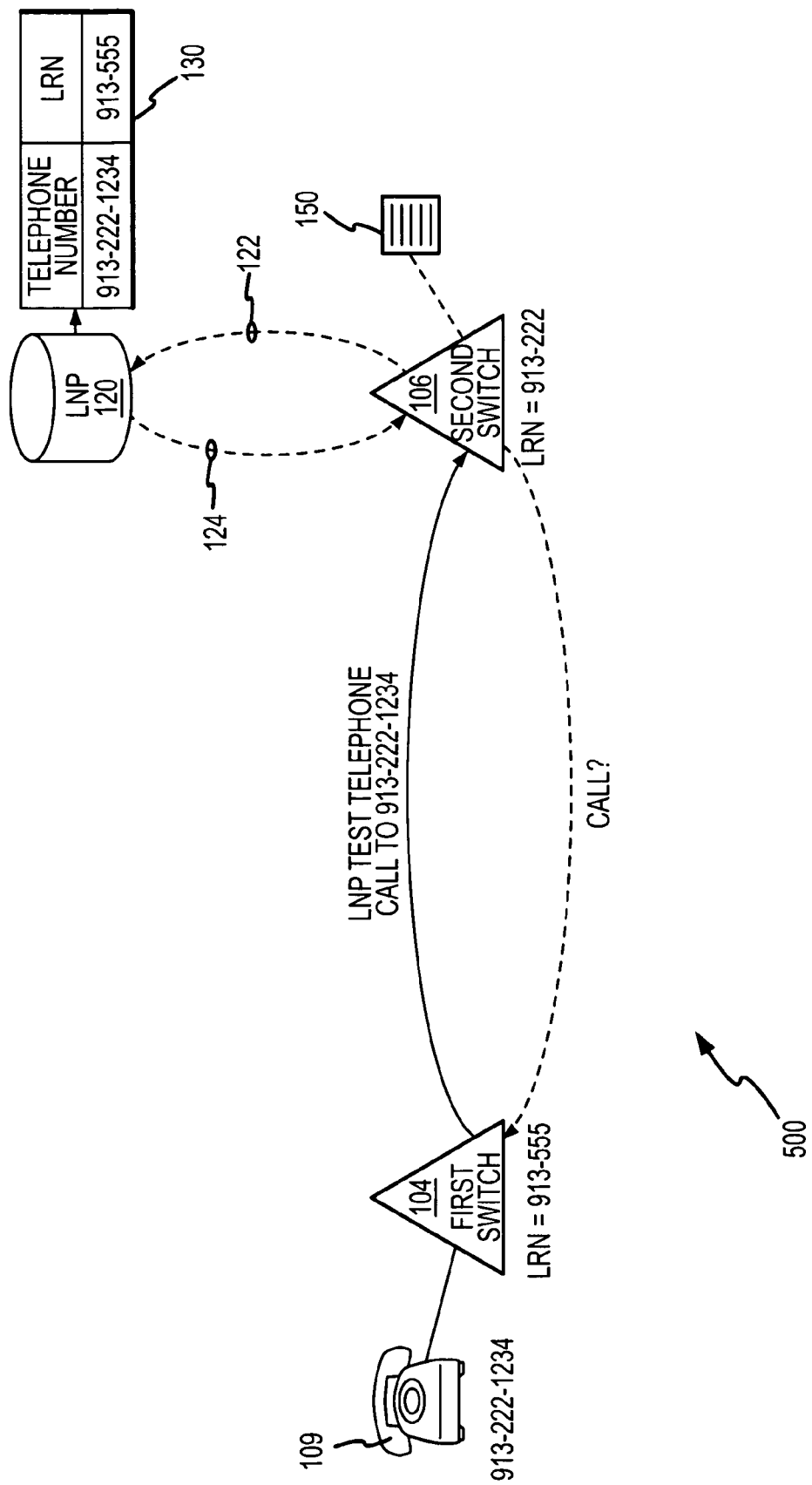
FIG. 5 shows a switch environment for testing a Local Number Portability (LNP) ported telephone number according to an embodiment of the invention.

FIG. 5 shows a switch environment 500 for testing a Local Number Portability (LNP) ported telephone number according to an embodiment of the invention. The switching environment 500 includes a first switch 104 and a second switch 106. The second switch 106 has been assigned a LRN of 913-222 in this example, and the first switch 104 has been assigned a LRN of 913-555.

The first switch 104 includes a number of associated telephones and telephone lines. One such telephone 109 is shown. The telephone 109 has a telephone number of 913-222-1234. In this example, the telephone number 913-222-1234 comprises a LNP-ported telephone number, as the telephone 109 has been physically moved from the second switch 106 to the first switch 104. This number is a number that the subscriber desired to keep, and therefore had ported to the first switch 104 via the LNP capability. Without the use of the LNP capability, the telephone number of the telephone 109 would be 913-555-1234, reflecting the local switch that is physically connected to the telephone 109. However, when a telephone number is ported, the telephone number of the telephone 109 stays the same even when it is moved to a different local switch. As a result, in the example shown the telephone number remains 913-222-1234.

In an example of proper LNP operation of the LNP-ported telephone number, the first switch 104 generates a LNP test telephone call to the second switch 106 using the LNP-ported telephone number of 913-222-1234. The second switch 106 performs a LNP dip 122 in order to route the LNP test telephone call. The LNP dip 122 correlates the dialed telephone number to a stored LRN, wherein the LRN is a 6-digit number that specifies an end (i.e., local) switch. The LNP dip 122 accesses the LRN from a LNP database 120. In one embodiment, the LRN information comprises a LRN table 130 that stores LNP-ported telephone numbers and corresponding LRNs. In this example of proper LNP operation, the input LNP test telephone call of 913-222-1234 produces the LRN of 913-555. The LRN is substituted into the CdPN field and the LNP test telephone call is then routed from the second switch 106 based on the CdPN field. The second switch 106 therefore uses the LNP dip response 124 to route the LNP test telephone call back to the first switch 104, using a routing information 150 of the second switch 106.

In certain situations or scenarios, it is greatly desired to test the LRN-ported telephone number of the telephone 109. For example, if the first switch 104 has been modified, testing may be needed. If the telephone 109 has just been ported (i.e., has just been assigned a new LRN number), then testing may be needed. Other testing scenarios may also exist.

To test the LNP-ported telephone number, the first switch 104 generates a LNP test telephone call to the second switch 106. The LNP test telephone call is targeted to the LNP-ported telephone number, i.e., the CdPN from the first switch 104 comprises the telephone number 913-222-1234. The LNP test telephone call is transferred to the second switch 106 by the first switch 104 and the first switch 104 waits for the LNP test telephone call to be returned. If the routing information 150 of the second switch 106 is correct, then the routing of the LNP test telephone call in the second switch 106 will return the LNP test telephone call back to the first switch 104. If the first switch 104 receives the LNP test telephone call back from the second switch 106, then the LNP-ported telephone number is fully functional and the routing in the second switch 106 is correct. All LNP-ported telephone numbers of the first switch 104 (or any switch) can be tested in this manner, such as in an iterative fashion.

If the first switch 104 does not receive the LNP test telephone call back, then two separate problems may exist. A first possible problem is that the LNP-ported telephone number may be improperly stored in the LNP database 120. As a result, a LNP dip process may retrieve an incorrect LRN and insert the incorrect LRN in the LNP test telephone call. The incorrect LRN will result in erroneous routing. A second possible problem is that a correct LRN obtained from the LNP database 120 may be improperly routed in the second switch 106. For example, routing information 150 of the second switch 106 may be erroneous, and the second switch 106 may route the LNP test telephone call improperly even if the LRN retrieved for the telephone call is correct.

The test of FIG. 5 does not indicate which problem may have occurred. The test of FIG. 5 only shows that one (or maybe both) error conditions are present. However, the test of FIG. 5 may be used in conjunction with other test routines in order to fully determine a source of error (see FIGS. 8-9 and the accompanying discussion below).

Figure 6:
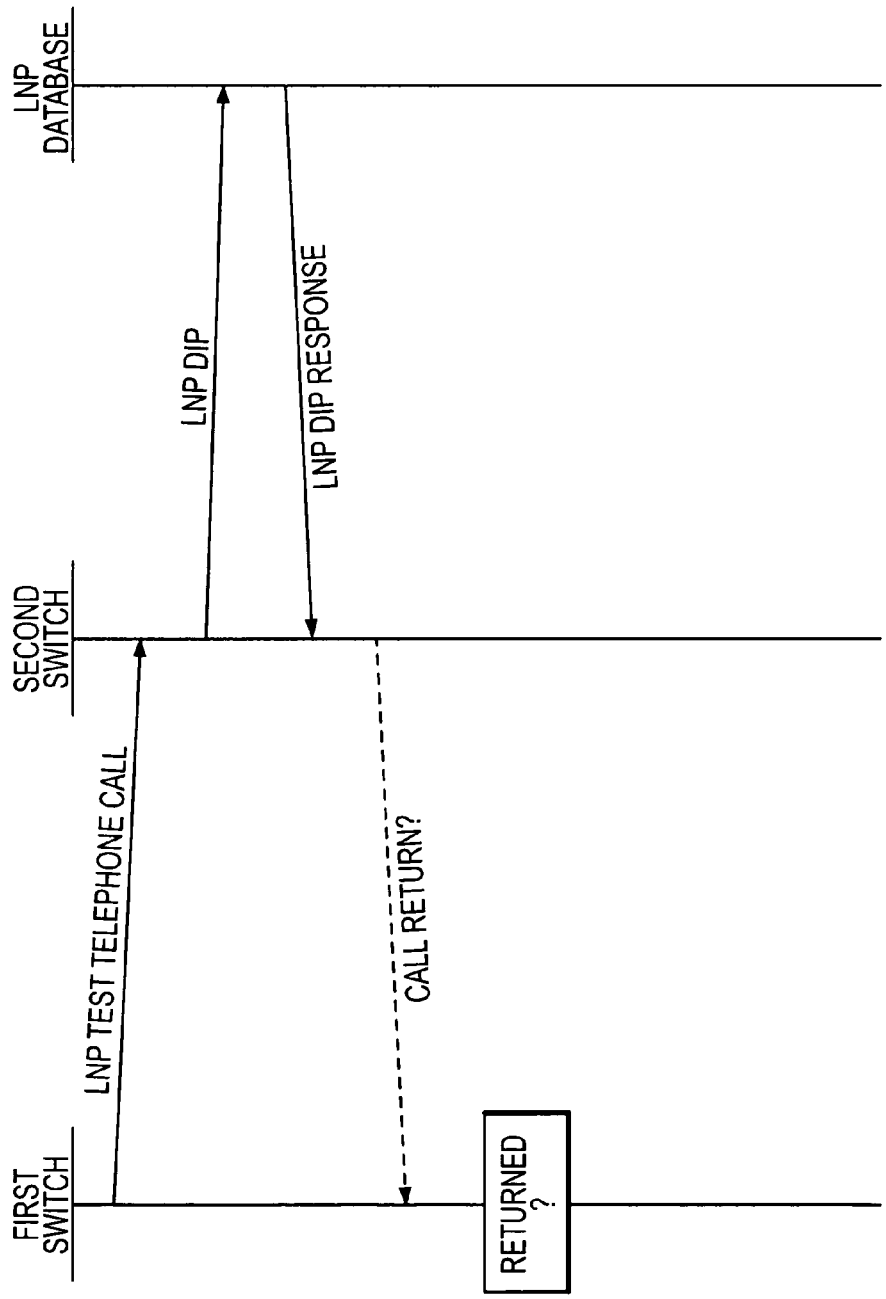
FIG. 6 is a message flow diagram for the LNP-ported telephone number testing of FIG. 5, showing messages that are generated in the test according to an embodiment of the invention.

FIG. 6 is a message flow diagram for the LNP-ported telephone number testing of FIG. 5, showing messages that are generated in the test according to an embodiment of the invention. The first switch 104 generates a LNP test telephone call to the second switch 106. The LNP test telephone call is targeted to the LNP-ported telephone number associated with the first switch 104. The second switch 106 receives the LNP test telephone call and determines that the included telephone number is a LNP-ported telephone number. Subsequently, the second switch 106 generates a LNP dip 122 to the LNP database 120 in order to obtain a corresponding LRN. The LNP dip response 124 provides a LRN to the second switch 105. The second switch 106 routes the LNP test telephone call to the LRN that is obtained through the LNP dip 122. If the LNP dip 122 obtains the correct LRN and if the second switch 106 has correct routing information 150, then the LNP test telephone call will be returned to the first switch 104. However, if the routing in the second switch 106 is not correct, then the LNP test telephone call will not be returned to the first switch 104. If the first switch 104 receives the LNP test telephone call back from the second switch 106, then the test can be determined to be successful and the LRN has been correctly routed in the second switch 106. If the first switch 104 does not receive the LNP test call back from the second switch 106, the first switch 104 can indicate that the LNP-ported telephone number is being incorrectly routed in the second switch 106.

Figure 7:
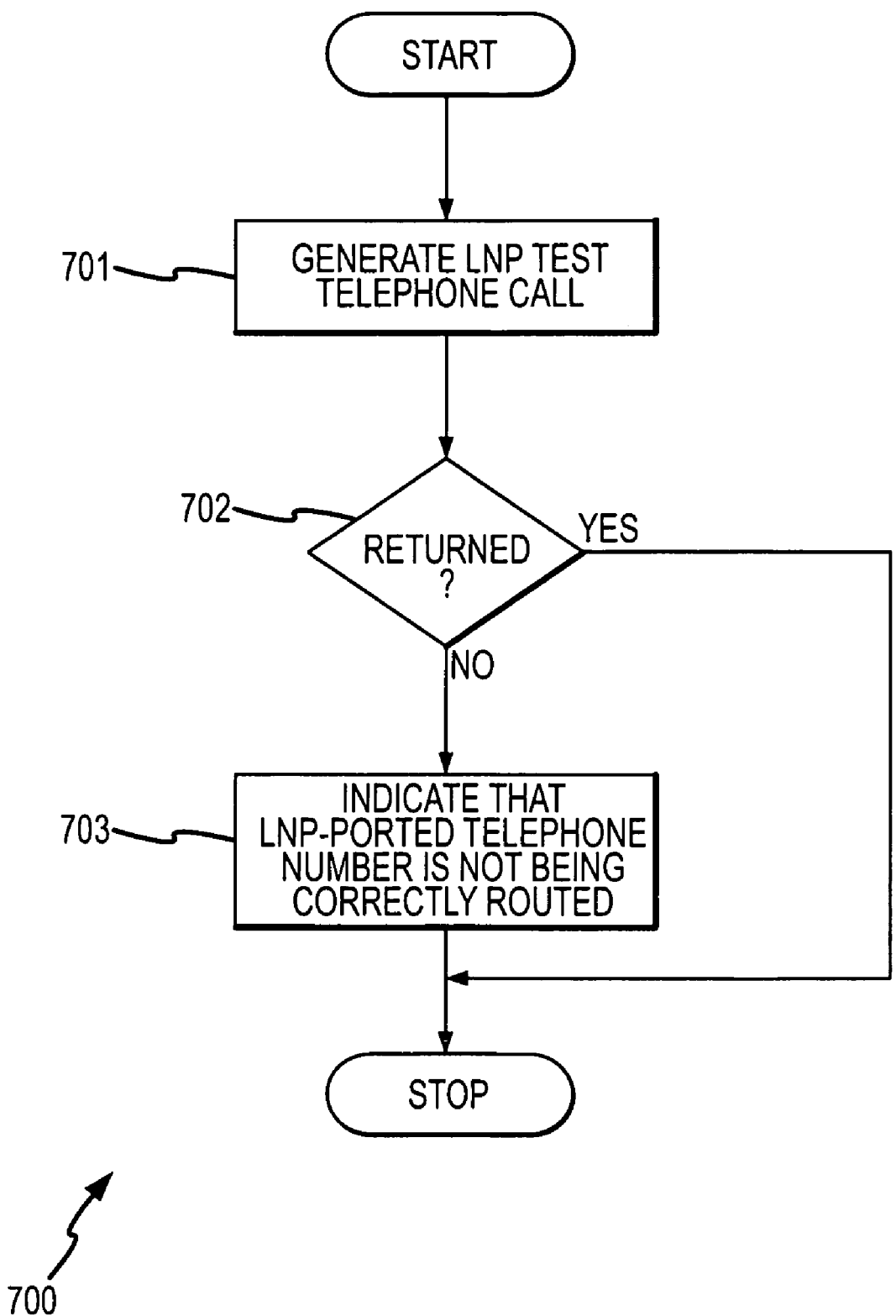
FIG. 7 is a flowchart of a method for testing a LNP-ported telephone number according to an embodiment of the invention.

FIG. 7 is a flowchart 700 of a method for testing a LNP-ported telephone number according to an embodiment of the invention. In step 701, the first switch 104 generates a LNP test telephone call to the second switch 106, with the LNP test telephone call being targeted to the LNP-ported telephone number associated with the first switch 104, as previously discussed.

In step 702, the first switch 104 waits for the LNP test telephone call to be returned back from the second switch 106. The first switch 104 waits for a predetermined time period. If the LNP test telephone call is not returned from the second switch 106 by the end of the predetermined time period, then the method proceeds to step 703. Otherwise, if the LNP test telephone call is returned from the second switch 106 by the end of the predetermined time period, the method exits.

In step 703, because the LNP test telephone call is not returned from the second switch 106, an error is indicated. The error indicates that the LNP-ported telephone number is not being correctly routed in the second switch 106.

The LNP testing can additionally be performed in an automated fashion. For example, LNP testing schedules can be transmitted to various switches of a communication network. A LNP testing schedule can include testing information such as an originating switch identifier, a targeted switch identifier, a testing time when the test is to be performed, and one or more LNP-ported telephone numbers to be tested. The originating switch can receive the testing schedule and can perform the LNP testing that is specified in the testing information.

Figure 8:
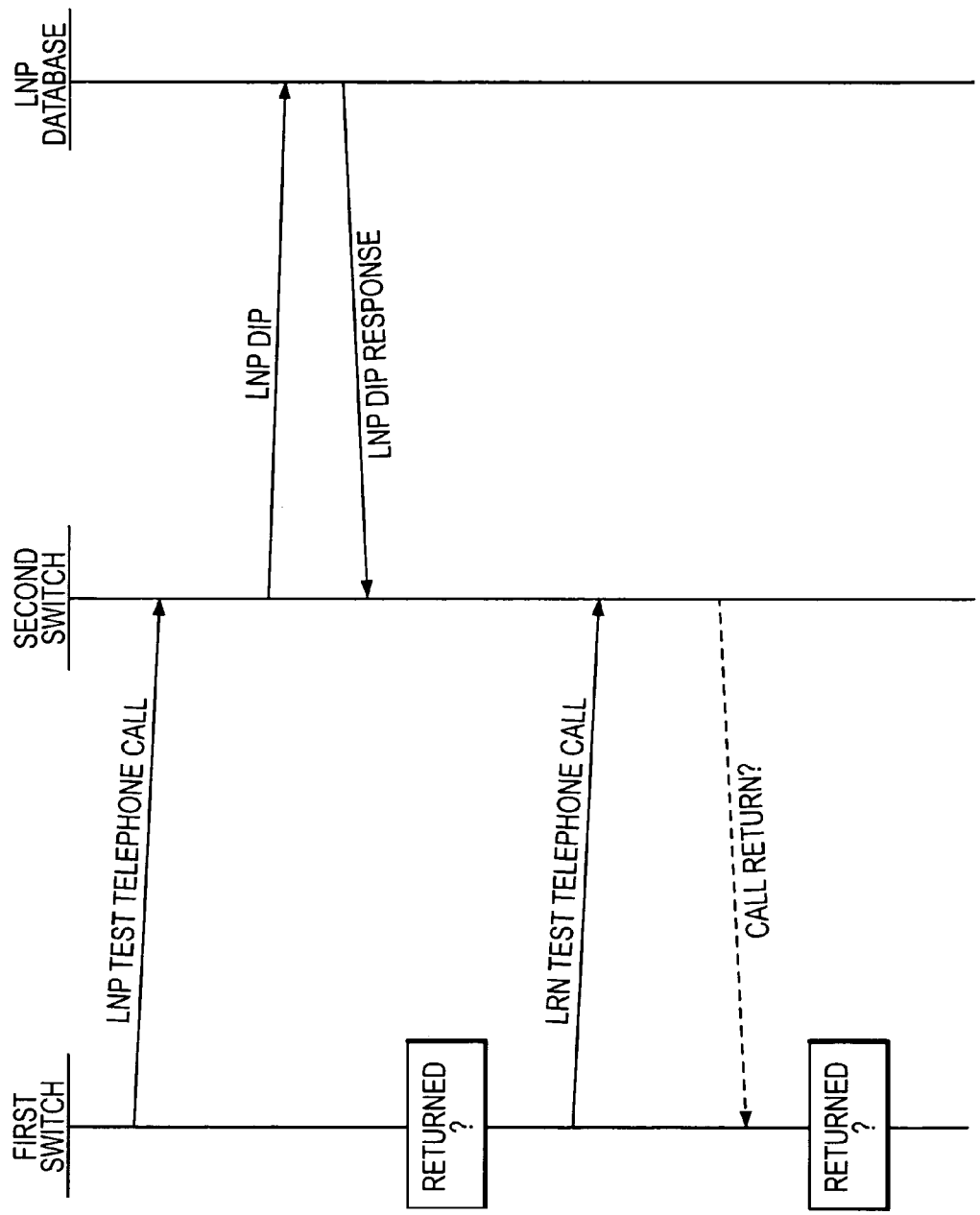
FIG. 8 is a message flow diagram for the LNP-ported telephone number testing of FIG. 5, showing messages that are generated in the test according to an embodiment of the invention.

FIG. 8 is a message flow diagram for the LNP-ported telephone number testing of FIG. 5, showing messages that are generated in the test according to an embodiment of the invention. The first switch 104 generates a LNP test telephone call to the second switch 106. The LNP test telephone call is targeted to the LNP-ported telephone number associated with the first switch 104. The second switch 106 receives the LNP test telephone call and determines that the included telephone number is a LNP-ported telephone number. Subsequently, the second switch 106 can generate a LNP dip 122 to the LNP database 120 in order to obtain a corresponding LRN. A LNP dip response 124, if received, provides a LRN to the second switch 105. In this example, the LNP test telephone call is not returned to the first switch 104 (i.e., the "Returned?" box does not receive signaling back from the second switch in response to the LNP test telephone call). At this point, the first switch 104 cannot determine the cause of the lack of the returned LNP test telephone call. Therefore, a LRN test can optionally be conducted in order to obtain more information and determine why the LNP test telephone call failed. The following steps are optional, and may be unnecessary wherein STP test capabilities exist to track the LNP test telephone call or otherwise log any resulting activities of the affected switch(es) or components.

As a consequence, the first switch 104 generates a LRN test telephone call to the second switch 106. The LRN test telephone call is targeted to the LRN of the first switch 104. If the first switch 104 receives the LRN test telephone call back from the second switch 106, then the LRN has been correctly routed in the second switch 106. The error can then be determined to be an error in the LNP dip, including erroneous information in the LNP database 120.

If the first switch 104 does not receive the LRN test telephone call back from the second switch 106, then the LRN routing in the second switch 106 is erroneous and the error can be determined to be in the routing information 150.

Figure 9:
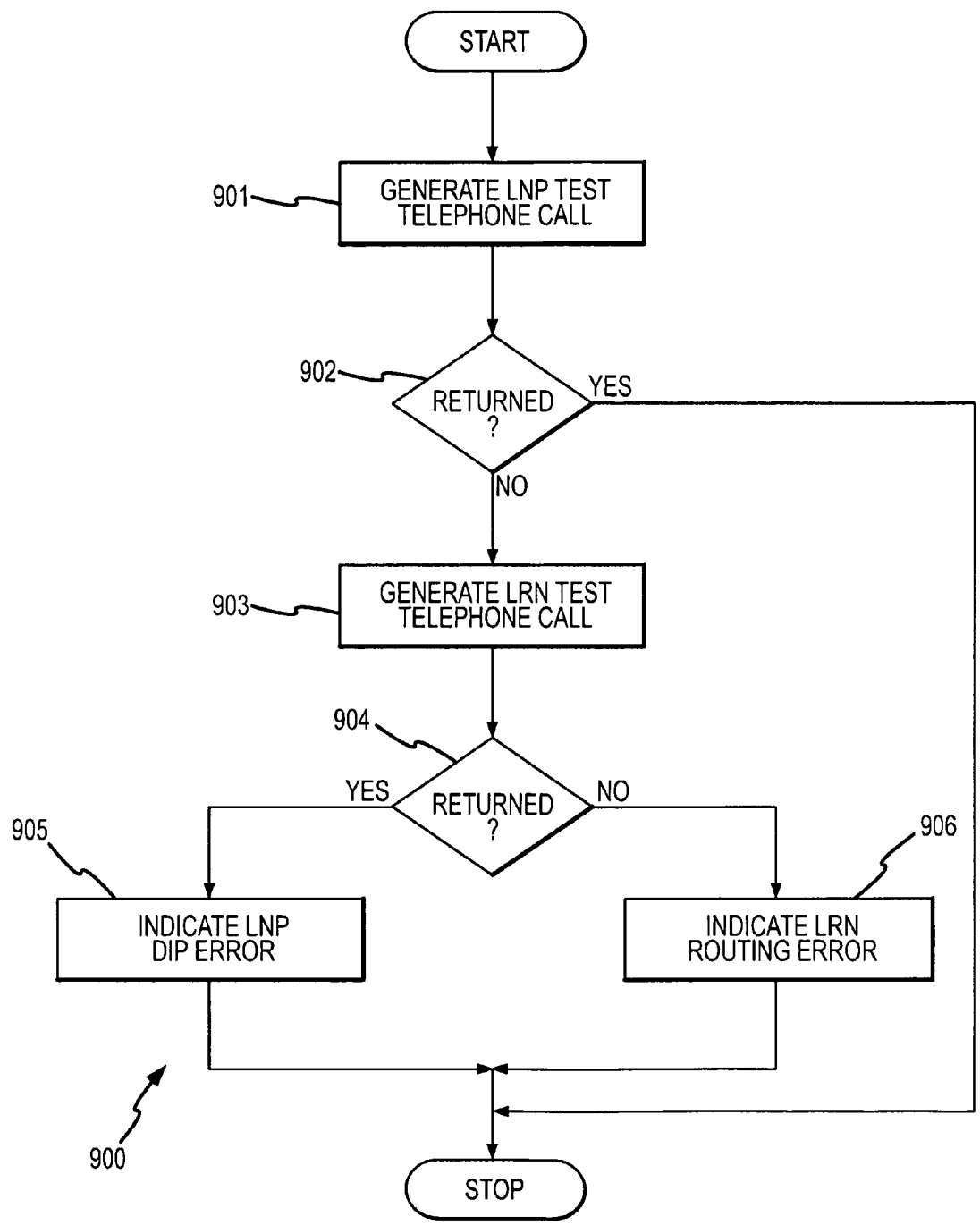
FIG. 9 is a flowchart of a method for testing a LNP-ported telephone number according to an embodiment of the invention.

FIG. 9 is a flowchart 900 of a method for testing a LNP-ported telephone number according to an embodiment of the invention. In step 901, the first switch 104 generates a LNP test telephone call to the second switch 106, with the LNP test telephone call being targeted to the LNP-ported telephone number associated with the first switch 104, as previously discussed.

In step 902, the first switch 104 waits for the LNP test telephone call to be returned back from the second switch 106. The first switch 104 waits for a predetermined time period. If the LNP test telephone call is not returned from the second switch 106, then the method proceeds to step 903. Otherwise, if the LNP test telephone call is returned from the second switch 106, the method exits.

In step 903, the first switch 104 generates a LRN test telephone call to the second switch 106, with the LRN test telephone call being targeted to the LRN of the first switch 104, as previously discussed.

In step 904, the first switch 104 waits for the LRN test telephone call to be returned back from the second switch 106. The first switch 104 waits for a predetermined time period. If the LRN test telephone call is returned by the end of the predetermined time period, then the method branches to step 905. Otherwise, if the LRN test telephone call is not returned by the end of the predetermined time period, the method branches to step 906.

In step 905, because the LRN test telephone call is returned from the second switch 106, a LNP dip error is indicated.

In step 906, because the LRN test telephone call is not returned from the second switch, a LRN routing error is indicated. The LRN routing error is due to an error in the routing information 150 of the second switch 150. The LRN routing error can be in the second switch. Alternatively, the LRN routing error can be an error in an intermediate switch.

It should be understood that this method comprises both a LNP test and a LRN test. Although the LNP test is shown as being performed first, alternatively the method could perform the LRN test before the LNP test.

The LNP testing can be performed in an automated fashion. For example, LNP testing schedules can be transmitted to various switches of a communication network. A LNP testing schedule can include testing information such as an originating switch identifier, a targeted switch identifier, a testing time when the test is to be performed, one or more LNP-ported telephone numbers to be tested, and one or more LRNs to be tested. The originating switch can receive the testing schedule and can perform the LNP/LRN testing that is specified in the testing information.

Figure 10:
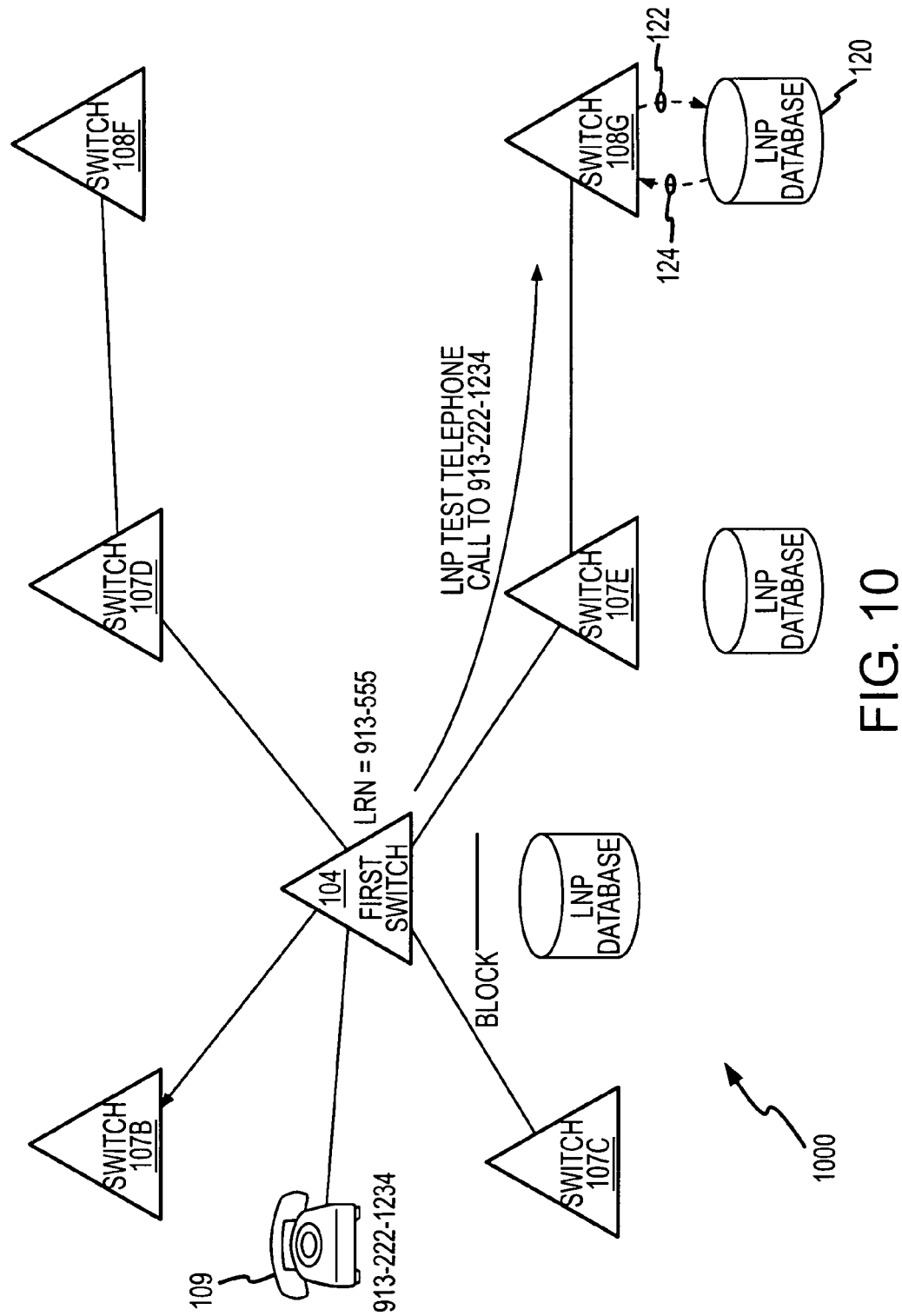
FIG. 10 shows a switch environment for testing a LNP-ported telephone number according to an embodiment of the invention.

FIG. 10 shows a switch environment 1000 for testing a LNP-ported telephone number according to an embodiment of the invention. The switch environment 1000 includes a first switch 104. The switch environment 1000 also includes neighboring switches 107B-107E. The first switch 104 is connected to one or more of the neighboring switches 107B-107E. The switch environment 1000 further includes distant switches 108F-108G. The distant switches 108F-108G are connected to one or more of the neighboring switches 107B-107E.

Where it is desired to test a LNP function in a distant switch 108F or 108G, the originating switch 104 cannot be allowed to perform the LNP dip. It is desired that the distant switch 108F or 108G perform the LNP dip. Therefore, when testing switches beyond the neighboring switches 107E or 107D, the originating switch 104 must have its LNP dip capability disabled. In this manner, it can be ensured that the distant switch 108F or 108G will perform the LNP dip.

Figure 11:
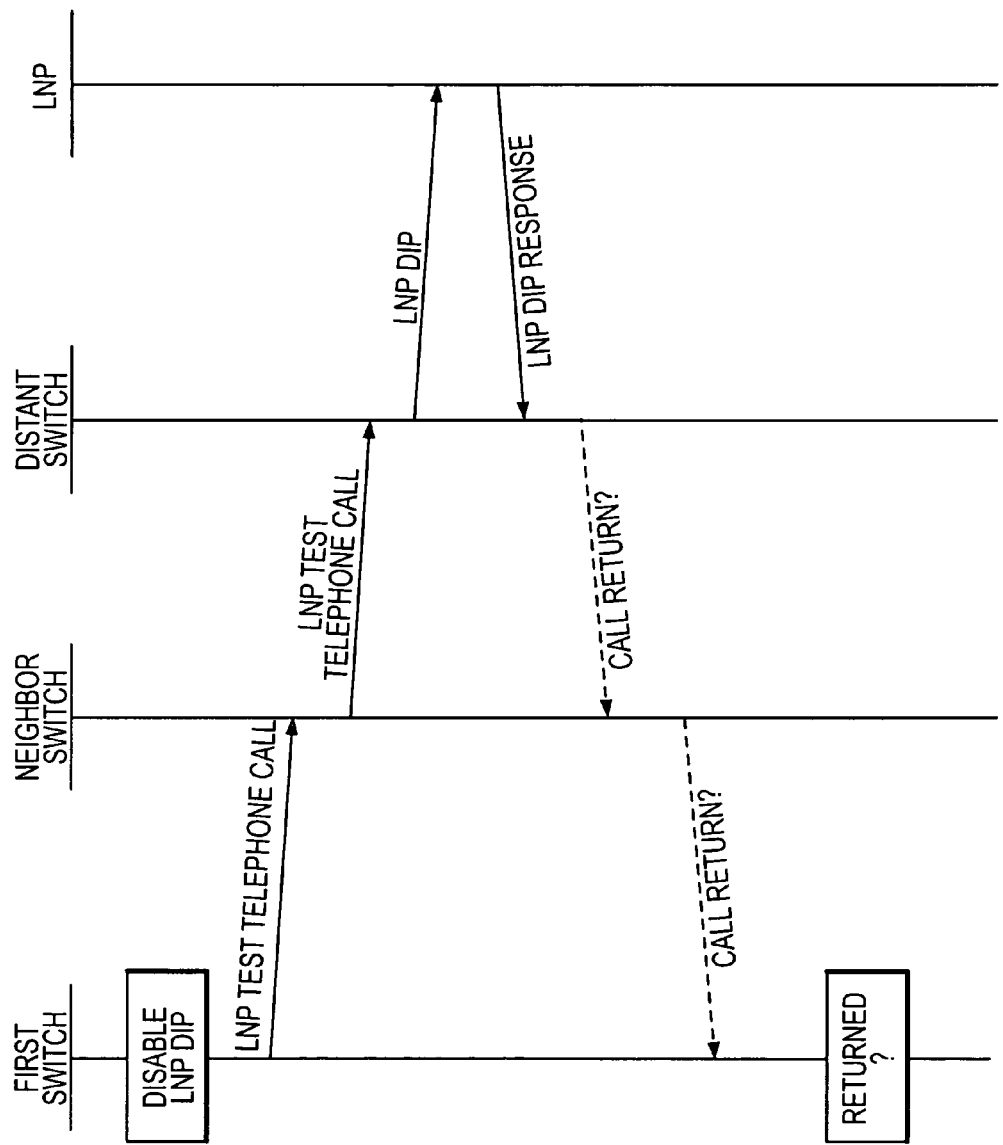
FIG. 11 is a message flow diagram for the LNP-ported telephone number testing of FIG. 10, showing messages that are generated in the test according to an embodiment of the invention.

FIG. 11 is a message flow diagram for the LNP-ported telephone number testing of FIG. 10, showing messages that are generated in the test according to an embodiment of the invention. The LNP dip capability of the first switch is first disabled, as previously discussed. The first switch 104 generates a LNP test telephone call to a distant switch 108G through a neighboring switch(es) 107. The LNP test telephone call is targeted to a LNP-ported telephone number. The NPA-NXX portion of the LNP test telephone call is associated with the distant switch 108G. The neighboring switch 107 transfers the LNP test telephone call to the distant switch 108G. The distant switch 108G therefore performs the LNP dip to an associated LNP database 120. The distant switch 108G receives a LNP dip response, including a LRN for the first switch 104. The distant switch 108G should return the LNP test telephone call to the first switch 104 through the neighboring switch(es) 107 if the LNP dip functioned correctly (assuming no error in the LRN routing in the neighboring switch(es) 107 and no problem in LRN routing in the distant switch 108G).

If the LNP dip obtains the correct LRN and the routing information as discussed above is correct, then the LNP test telephone call will be returned to the first switch 104. However, if the LNP dip does not obtain the correct LRN, then the LNP test telephone call will not be returned to the first switch 104. If the first switch 104 receives the LNP test telephone call back from the distant switch 108G, then the test can be determined to be successful and that the LNP dip at the distant switch 108G has been correctly performed and the routing information on the distant switch and intermediate switches is correct. If the first switch 104 does not receive the LNP test telephone call back from the distant switch 108G, then the first switch 104 can indicate that a routing error has occurred in the distant switch 108G or in an intermediate switch. Existing STP testing capabilities can be used to determine where the call failed.

Figure 12:
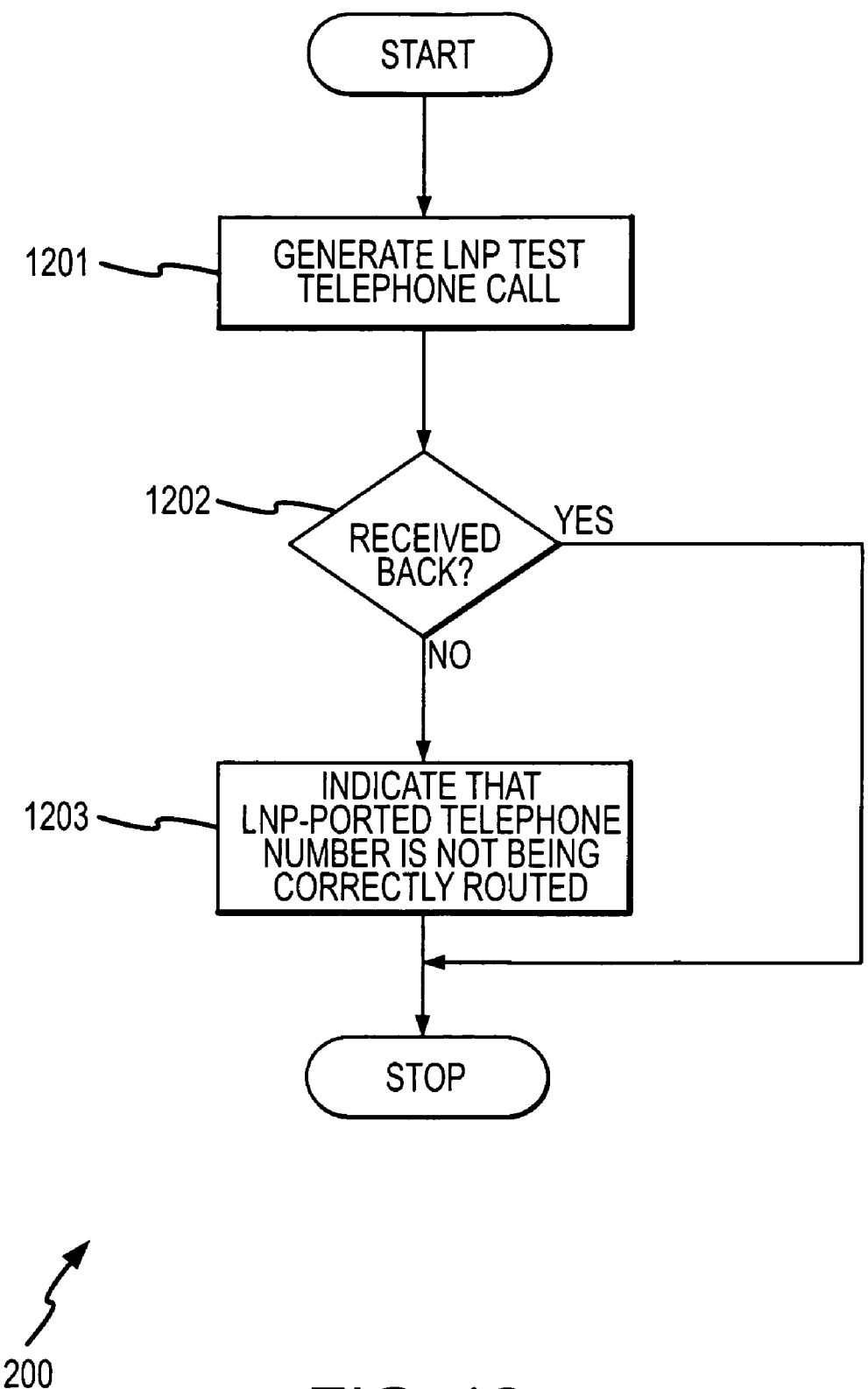
FIG. 12 is a flowchart of a method for testing a LNP-ported telephone number according to an embodiment of the invention.

FIG. 12 is a flowchart 1200 of a method for testing a LNP-ported telephone number according to an embodiment of the invention. In step 1201, the first switch 104 generates a LNP test telephone call to the distant switch 108G, with the LNP test telephone call being targeted to a LNP-ported telephone number associated with the first switch 104, as previously discussed.

In step 1202, the first switch 104 waits for the LNP test telephone call to be returned back from the distant switch 108G. The first switch 104 waits for a predetermined time period. If the LNP test telephone call is not returned from the distant switch 108G by the end of the predetermined time period, then the method proceeds to step 1203. Otherwise, if the LNP test telephone call is returned from the distant switch 108G by the end of the predetermined time period, the method exits.

In step 1203, because the LNP test telephone call is not returned from the distant switch 108G, an error is indicated. The error indicates that the LNP-ported telephone number is not being correctly routed. The routing error can be in the distant switch 108G. Alternatively, the routing error can be in at least one intermediate switch. It should be noted that the testing can be systematically performed, wherein the intermediate switches are tested before the distant switch 108G is tested. Consequently, where such systematic testing has been performed, in this step the routing error can be assigned to the distant switch 108G.

The LNP testing can be performed in an automated fashion. For example, LNP testing schedules can be transmitted to various switches of a communication network. A LNP testing schedule can include testing information such as an originating switch identifier, a targeted switch identifier, a testing time when the test is to be performed, and one or more LNP-ported telephone numbers to be tested. In addition, the testing schedule can include information for disabling LNP dips by specific switches or nodes. The originating switch can receive the testing schedule and can perform the testing that is specified in the testing information.

It should be understood that a test according to any of the embodiments of the invention can be iteratively performed. A test can be repeated for multiple LNP-ported telephone numbers. A test can be repeated for all switches connected to a first switch. A test can be repeatedly performed for multiple distant switches.

The invention claimed is:

1. A method for testing a Local Number Portability (LNP) ported telephone number, the method comprising:
in a first switch, generating a LNP test telephone call to a second switch, with the LNP test telephone call being targeted to the LNP-ported telephone number associated with the first switch;
indicating that the LNP-ported telephone number is being correctly routed in the second switch if the first switch receives the LNP test telephone call back from the second switch; and
indicating that the LNP-ported telephone number is being incorrectly routed in the second switch if the first switch does not receive the LNP test telephone call back from the second switch.

2. The method of claim 1, further comprising waiting a predetermined time period after generating the LNP test telephone call before either indicating step.

3. The method of claim 1, with a Called Party Number (CdPN) field of a telephone call signaling for the LNP test telephone call including the LNP-ported telephone number.

4. The method of claim 1, with indicating that the LNP-ported telephone number is being incorrectly routed in the second switch comprising indicating an error in a LNP dip performed by the second switch.

5. The method of claim 1, further comprising iteratively testing one or more second switches using one or more subsequent LNP test telephone calls.

6. The method of claim 1, further comprising iteratively testing successive levels of switches inwardly or outwardly from the first switch.

7. The method of claim 1, further comprising in the second switch performing an LNP dip to a LNP database and obtaining the LRN in response to the second switch receiving the LNP test telephone call.

8. The method of claim 1, with the indicating that the LNP-ported telephone number is being incorrectly routed in the second switch comprising:
in the first switch, generating a LRN test telephone call to the second switch if the first switch does not receive the LNP test telephone call back from the second switch, with the LRN test telephone call being targeted to the LRN of the first switch;
indicating that the LRN is being incorrectly routed in the second switch if the first switch does not receive the LNP test telephone call back from the second switch and if the first switch does not receive the LRN test telephone call back from the second switch; and indicating that an LNP dip performed by the second switch produced an erroneous LRN for the LNP test telephone call if the first switch does not receive the LNP test telephone call back from the second switch and if the first switch receives the LRN test telephone call back from the second switch.

9. The method of claim 8, with a Called Party Number (CdPN) field of a telephone call signaling for the LRN test telephone call including the LRN assigned to the first switch.

10. The method of claim 8, with indicating that the LRN is being incorrectly routed in the second switch comprising indicating an error in a routing information of the second switch.

11. A method for testing a Local Number Portability (LNP) ported telephone number, the method comprising:
 in a first switch, generating a LNP test telephone call to a second switch, with the LNP test telephone call being targeted to the LNP-ported telephone number associated with the first switch;
 indicating that the LNP-ported telephone number is being correctly routed in the second switch if the first switch receives the LNP test telephone call back from the second switch;
 in the first switch, generating a LRN test telephone call to the second switch if the first switch does not receive the LNP test telephone call back from the second switch, with the LRN test telephone call being targeted to the LRN of the first switch;
 indicating that the LRN is being incorrectly routed in the second switch if the first switch does not receive the LNP test telephone call back from the second switch and if the first switch does not receive the LRN test telephone call back from the second switch; and
 indicating that an LNP dip performed by the second switch produced an erroneous LRN for the LNP test telephone call if the first switch does not receive the LNP test telephone call back from the second switch and if the first switch receives the LRN test telephone call back from the second switch.

12. The method of claim 11, further comprising in the second switch performing an LNP dip to a LNP database and obtaining the LRN in response to the second switch receiving the LNP test telephone call.

13. The method of claim 11, further comprising:
 waiting a first predetermined time period after generating the LNP test telephone call before indicating that the LNP-ported telephone number is being correctly routed in the second switch; and
 waiting a second predetermined time period after generating the LRN test telephone call before indicating that the LRN is being incorrectly routed or before indicating that the LNP dip produced an erroneous LRN.

14. The method of claim 11, with a Called Party Number (CdPN) field of a telephone call signaling for the LNP test telephone call including the LNP-ported telephone number.

15. The method of claim 11, with a Called Party Number (CdPN) field of a telephone call signaling for the LRN test telephone call including the LRN assigned to the first switch.

16. The method of claim 11, with indicating that the LRN is being incorrectly routed in the second switch comprising indicating an error in a routing information of the second switch.

17. The method of claim 11, further comprising iteratively testing one or more second switches using one or more subsequent LNP test telephone calls and corresponding LRN test telephone calls.

18. The method of claim 11, further comprising iteratively testing successive levels of switches inwardly or outwardly from the first switch.

19. A method for testing a Local Number Portability (LNP) ported telephone number, the method comprising:
 disabling a LNP dip capability in a first switch;
 in the first switch, generating a LNP test telephone call to a third switch through at least a second switch, with the LNP test telephone call being targeted to the LNP-ported telephone number associated with the first switch;
 indicating that the LNP-ported telephone number is being correctly routed in the third switch if the first switch receives the LNP test telephone call back from the third switch; and
 indicating that the LNP-ported telephone number is being incorrectly routed in the third switch or in an intermediate switch if the first switch does not receive the LNP test telephone call back from the third switch.

20. The method of claim 19, further comprising waiting a predetermined time period after generating the LNP test telephone call before either indicating step.

21. The method of claim 19, with a Called Party Number (CdPN) field of a telephone call signaling for the LNP test telephone call including the LNP-ported telephone number.

22. The method of claim 19, further comprising iteratively testing one or more third switches using one or more subsequent LNP test telephone calls.

23. The method of claim 19, further comprising iteratively testing successive levels of switches inwardly or outwardly from the first switch.

24. The method of claim 19, with the indicating that the LNP-ported telephone number is being incorrectly routed in the third switch comprising:
 in the first switch, generating a LRN test telephone call to the third switch if the first switch does not receive the LNP test telephone call back from the third switch, with the LRN test telephone call being targeted to the LRN of the first switch;
 indicating that the LRN is being incorrectly routed in the third switch if the first switch does not receive the LNP test telephone call back from the third switch and if the first switch does not receive the LRN test telephone call back from the third switch; and
 indicating that an LNP dip performed by the third switch produced an erroneous LRN for the LNP test telephone call if the first switch does not receive the LNP test telephone call back from the third switch and if the first switch receives the LRN test telephone call back from the third switch.

25. The method of claim 24, with a Called Party Number (CdPN) field of a telephone call signaling for the LRN test telephone call including the LRN assigned to the first switch.

26. The method of claim 24, with indicating that the LRN is being incorrectly routed in the third switch comprising indicating an error in a routing information of the third switch.

27. The method of claim 24, further comprising in the third switch performing the
 LNP dip to a LNP database and obtaining the LRN in response to the third switch receiving the LNP test telephone call.

28. The method of claim 24, further comprising waiting a second predetermined time period after generating the LRN test telephone call before either indicating step.

* * * * *